(12) United States Patent
Przybilski et al.

(10) Patent No.: US 12,248,639 B1
(45) Date of Patent: Mar. 11, 2025

(54) HUMAN OPERABLE CONTROLLER WITH TOUCH SENSOR

(71) Applicant: Input Labs Oy, Helsinki (FI)

(72) Inventors: Michael Przybilski, Helsinki (FI); Marcos Diaz, Helsinki (FI)

(73) Assignee: Input Labs Oy, Helsinki (FI)

( * ) Notice: Subject to any disclaimer, the term of this patent is extended or adjusted under 35 U.S.C. 154(b) by 0 days.

(21) Appl. No.: 18/509,342

(22) Filed: Nov. 15, 2023

(51) Int. Cl.
*G06F 3/02* (2006.01)
*G06F 3/041* (2006.01)

(52) U.S. Cl.
CPC ............ *G06F 3/0202* (2013.01); *G06F 3/041* (2013.01)

(58) Field of Classification Search
CPC ........ G06F 3/0202; G06F 3/041; A63F 13/24; A63F 13/235; A63F 13/211
See application file for complete search history.

(56) References Cited

U.S. PATENT DOCUMENTS

| | | | | |
|---|---|---|---|---|
| 2002/0067334 A1* | 6/2002 | Hinckley | ............... | G06F 3/0219 345/156 |
| 2006/0111180 A1* | 5/2006 | Cheng | ................. | A63F 13/2145 463/36 |
| 2006/0181521 A1* | 8/2006 | Perreault | ............... | G06F 3/0338 345/173 |
| 2013/0324254 A1* | 12/2013 | Huang | ................... | A63F 13/214 463/37 |
| 2015/0290534 A1* | 10/2015 | Igarashi | ................ | A63F 13/213 463/37 |
| 2017/0024035 A1* | 1/2017 | Pelis | ...................... | G06F 3/0346 |
| 2020/0353349 A1* | 11/2020 | Palmer | .................... | A63F 13/24 |
| 2021/0349546 A1* | 11/2021 | Morrison | ............... | G06F 3/0338 |

* cited by examiner

*Primary Examiner* — Hong Zhou
(74) *Attorney, Agent, or Firm* — Laine IP Oy (57) ABSTRACT

There is provided a human operable controller for controlling an application on an external computer system, the controller comprising: a controller body comprising a front and a back, wherein the front is opposite to the back; a thumb-operable control area arranged at the front of the controller body; a plurality of depressible buttons and a touch sensor arranged at the thumb-operable control area; wherein the controller body is shaped to be held in a hand or hands of a user of the controller such that the plurality of depressible buttons is operable by a thumb of the user with or without touching the touch sensor; a processing circuitry for generating at least one control signal based on user interaction with the plurality of depressible buttons and the touch sensor; and a communication interface for communicatively coupling with the external computer system and for providing the control signal to the external computer system to control the application.

15 Claims, 7 Drawing Sheets

HUMAN OPERABLE CONTROLLER WITH TOUCH SENSOR

TECHNICAL FIELD

Various example embodiments are generally related to human operable controllers. More particularly, the embodiments relate to utilizing combination of depressible buttons and touch sensor for controlling an application on external computer system.

BACKGROUND

Human operable controllers, herein referred to as simply controllers, are used to provide a control signal to control the execution of an application or applications run on an external computer system. The controller may be a device (e.g. controller device) or an apparatus (e.g. controller apparatus) or a part of a device or an apparatus (e.g. controller for controlling the device or apparatus). The controller may comprise means for generating the control signal based on e.g. user interaction with a plurality of depressible buttons and a touch sensor. For example, game controllers (e.g. video game controller such as Playstation controller, Xbox controller, or Joy-Con controller) or drone controllers can be used for such purpose.

BRIEF DESCRIPTION

According to some aspects, there is provided the subject matter of the independent claims. Some further aspects are defined in the dependent claims. One particularly interesting aspect is to utilize a combination of multiple depressible buttons and touch sensor to generate the control signal. Thus, it is be beneficial to utilize solutions such as those presented herein in order to enhance the use of multiple depressible buttons and touch sensor for generating such control signal or signals.

LIST OF THE DRAWINGS

In the following, the invention will be described in greater detail with reference to the embodiments and the accompanying drawings, in which.

DESCRIPTION OF EMBODIMENTS

The following embodiments are exemplary. Although the specification may refer to "an", "one", or "some" embodiment(s) in several locations of the text, this does not necessarily mean that each reference is made to the same embodiment(s), or that a particular feature only applies to a single embodiment. Single features of different embodiments may also be combined to provide other embodiments.

In recent years, a significant increase in the complexity of Human Interface Devices (HID), such as computer mice, videogame controllers, drone controllers and Virtual Reality (VR) controllers, has been observed. New input methods such as touch-sensitive surfaces, pressure sensors, motion sensors, and even biometric sensors have been proposed. At the same time there has been a continuous increase in the number of physical momentary switches and buttons (e.g. depressible buttons), as well as analog input axes. The number of mouse buttons, for example, has increased from two, in the Xerox Star in 1981, to three in the Logitech MouseMan in 1990. By the year 2005, this number had doubled with the Logitech G3 to six buttons, before increasing to 16 in 2009 with the Razer Naga, and even 20 buttons in the Logitech G600 by 2012. Table 1 outlines a similar progression in the complexity of videogame controllers with regard to the implemented number of buttons and analog control axis.

TABLE 1

Video game controller input complexity.

| Year | Gamepad | Buttons | Analog axis |
|------|---------|---------|-------------|
| 1983 | Nintendo NES | 8 | 0 |
| 1995 | Play Station | 14 | 0 |
| 2000 | Play Station 2 (Dual Shock 2) | 16 | 4 |
| 2001 | Nintendo GameCube | 12 | 6 |
| 2017 | Nintendo Switch (Pro) | 18 | 10 |
| 2022 | Play Station 5 (DualSense Edge) | 17 | 14 |

With the increasing input complexity, the placement and orientation of the various input mechanisms on the controller, while still maintaining usability and accessibility, becomes a significant challenge. A common alternative to the increased number of controls in a reduced space is the combination of several input methods with differing characteristics. Such an example would be the implementation of physical momentary buttons underneath other kinds of controls, resulting in a clickable (mouse) scroll-wheel, thumbstick, or a clickable track-pad.

In the case of the track-pad, for example, instead of using separate buttons to perform primary and secondary actions, adding a physical momentary button under the touch-sensitive surface provides feedback to trackpad clicks in a convenient way, without forcing the user to move the finger to another location or requiring the use of another finger. Such a solution results in additional challenges, however. As the user is not pressing individual buttons, they lack accurate feedback regarding their exact actions.

Clickable track-pads became very popular, and they are featured not only in most laptops, but also in videogame controllers such as Sony DualShock 4 (2013), or the Steam Controller (2015). Such input mechanism share another challenge, however. When determining the finger location on a trackpad, and accordingly emulating the input from different buttons (e.g., two mouse buttons on a laptop trackpad, or the "ABXY face"-buttons near the right trackpad of the Steam Controller), users do not receive physical feedback about which of the emulated buttons have been pressed. Accordingly, they do not know if they pressed with the correct finger placement, until after the button input has been sent to the application, and an according action and feedback are provided. In case the user pressed the trackpad, while their finger was in an ambiguous location, the programming governing the device may assume both virtual buttons were pressed, or neither of them were pressed. Both of these approaches may be problematic.

Another limitation of such virtual buttons is the inability of pressing or releasing several (virtual) buttons in arbitrary combinations. For example, in a track-pad in which a single tap emulates the primary mouse button, while a two-finger tap emulates the secondary mouse button, it is not possible to virtually press primary and secondary mouse buttons simultaneously. In a similar example, when the right trackpad on the Steam Controller emulates ABXY buttons, it is not possible to press and hold one button and receive haptic feedback when pressing another button, as the physical button underneath the touch surface is already depressed. Similar problem applies in classic controller layouts, such as in the Xbox controller, where the ABXY buttons and the right thumb-stick are expected to be operated with the same digit, the right thumb. This limits the actions that can be performed simultaneously.

Often it is also desired to trigger an action for a period of time. For example, enabling different action to be performed on the external computer system using the same button or buttons of the controller. Enabling such a mode requires either separate actions to enable, and later disable such mode, or the continuous interaction, such as a button-press. Using two distinct actions may cause additional latency, which especially in controlling e.g. drone can be very detrimental. Keeping a button depressed, on the other hand, requires the application of a continuous force, which after some time may result in significant muscle fatigue.

Hence, it may be beneficial to provide solution that enables the same button to provide different control signals depending on the mode of the controller. A solution is proposed herein in which touch sensor of the controller can be used, for example, to change the controller mode and thus change at least one control signal associated with the press of the button. More particularly, it is proposed how to position at least some of the buttons and touch sensor of the controller so that the aforementioned benefit is achievable. Even further, the proposed positioning of the touch sensor in proximity to the button enables simultaneous use of the buttons and the touch sensor with only one finger of the user. This provides the benefit of reduced controller complexity and may even reduce muscle fatigue of the user when using the controller. For instance, muscle fatigue may be reduced as the thumb of the user can simply rest on the touch sensor to detect touch instead of requiring user to actively press a button to cause certain control action (i.e. generation of control signal that causes action). But at the same time the user may further use the thumb to press one or more buttons to cause certain other control action. Such has clear benefits for HID use cases, such as controlling drones, as it may increase safety of the drone controlling.

Figure 1:
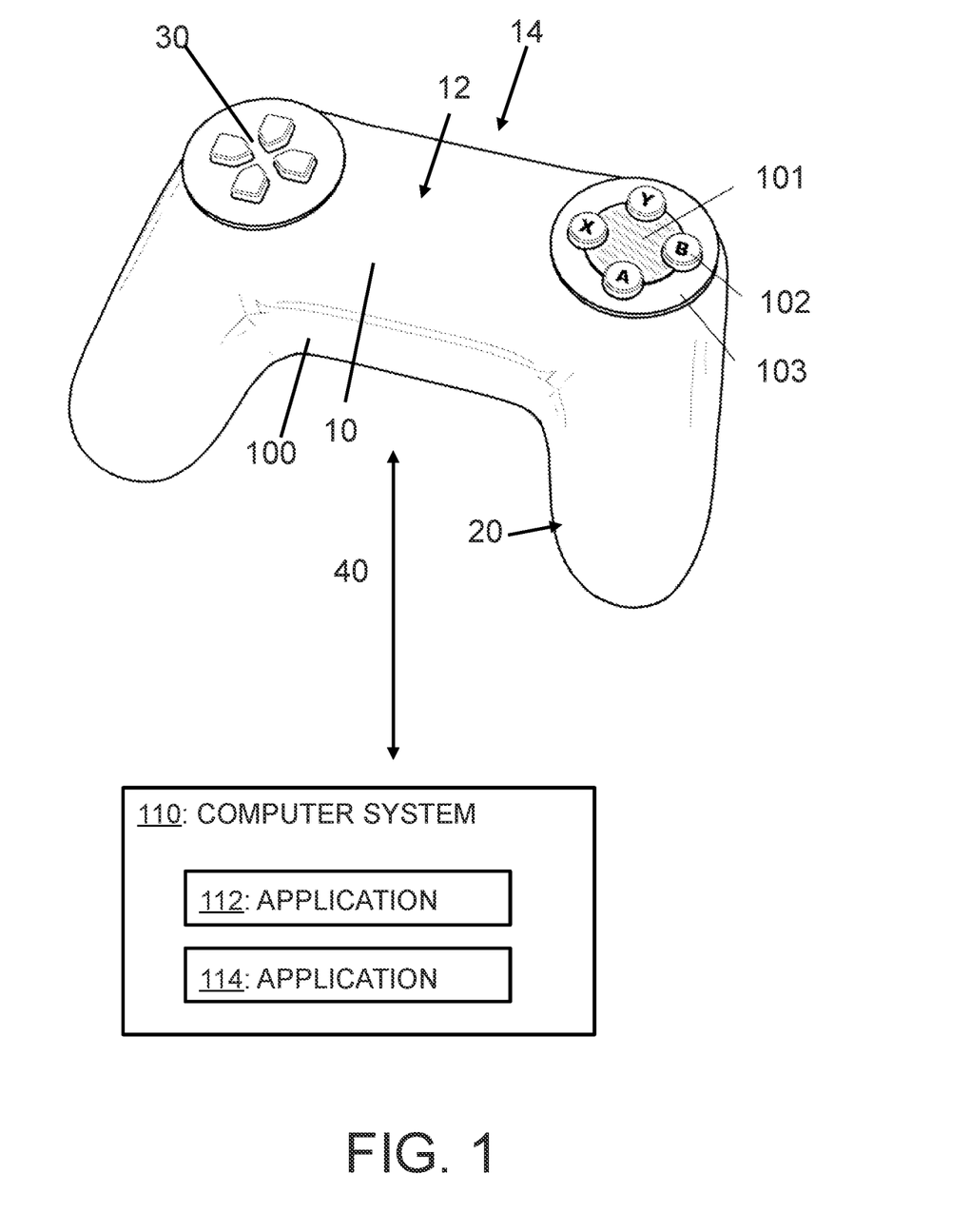
FIG. 1 presents a system including controller and computer system according to an embodiment.
Figure 2:
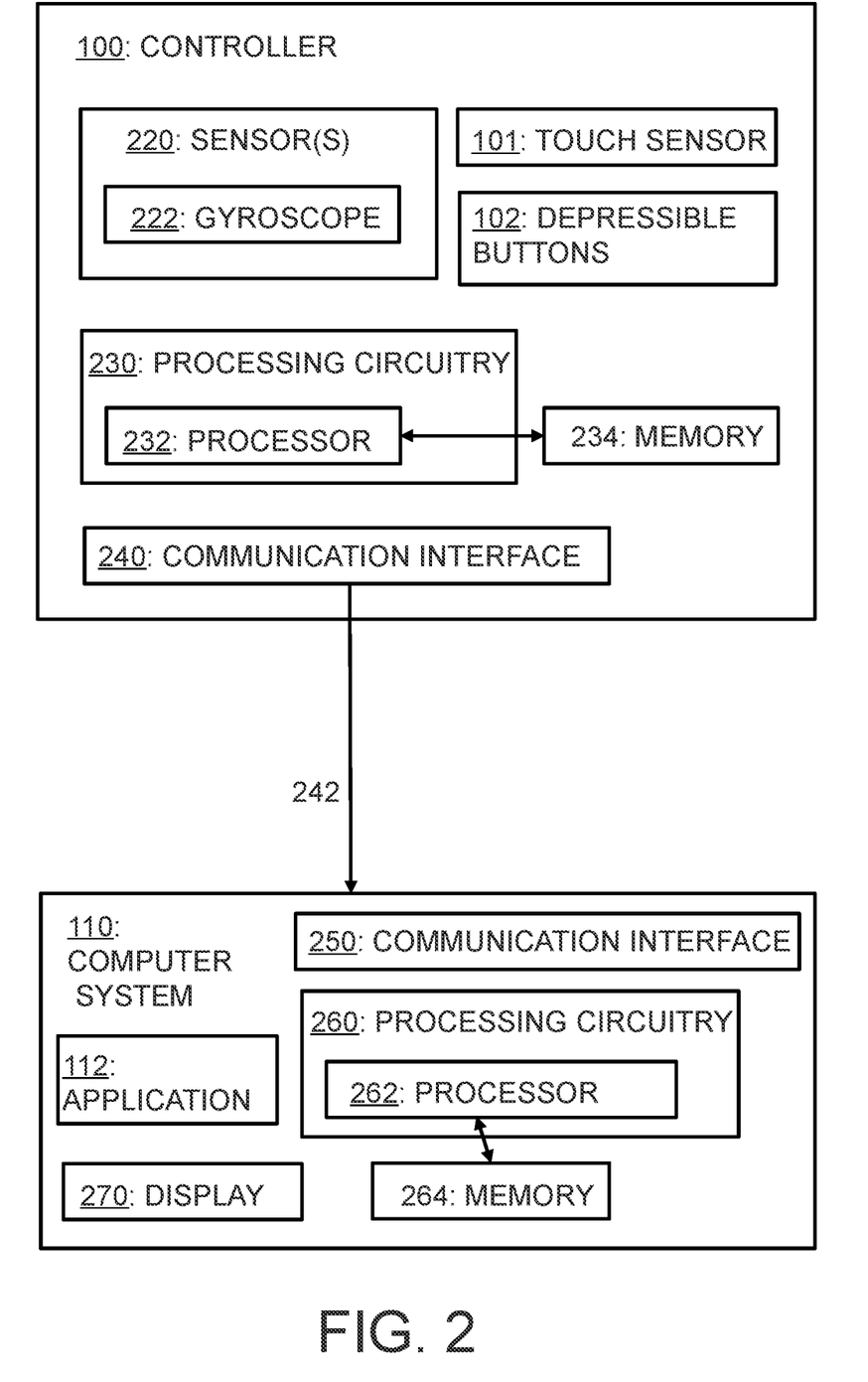
FIG. 2 shows block diagram of a system including controller and computer system according to an embodiment.

FIGS. 1 and 2 illustrate examples of a system which comprises controller 100 and computer system 110. Computer system 110 may be external to the controller, meaning that it may not be comprised in the controller 100. Computer system 110 should be seen as an example; other similar types of systems may be controlled by using the described controller 100. For example, the computer system 110 may be configured to control operation of a drone. However, this should be understood as one non-limiting example.

Referring to FIG. 1, the controller 100 may be or be comprised in a game controller, gaming controller, drone controller, remote controller, or computer mouse, to name a few examples. In general, the controller 100 may be understood as a Human Interaction Device (HID). Controller 100 may be human operable meaning that the controller 100 may be used by a human user (or simply user). Controller 100 may also be referred to as controller device 100.

The controller comprises a controller body 10 comprising a front 12 (i.e. front side) and a back 14 (i.e. back side), wherein the front 12 is opposite to the back 14. Example of this is shown in FIG. 1. Controller body 10 may further comprise casing, such as plastic casing, that encloses components of the controller 100. Skilled person understands, based on FIG. 1, how front 12 and back 14 are arranged on the controller 100.

The controller 100 further comprises a thumb-operable control area 103 arranged at the front 12 of the controller body 10. The term thumb-operable control area is used herein to define that such an area is usable with thumb of the user when the controller 100 is used as it is configured to be used. That is, the controller 100 is configured to be held in the hands of the user by grabbing (or holding) the controller 100 from a handle 20 (or handles, depending whether the controller 100 comprises one or two handles, see example of one-hand controller 600 in FIG. 6). As the user holds the device from the handle(s) 20, the controls at the thumb-operable control area are usable by the thumb of the user. An example is shown in FIG. 7, in which user holds the controller (e.g. controller 100) using his/her hand 700. As shown in FIG. 7, user's thumb is at the thumb-controllable area. According to an embodiment, the thumb-operable control area is arranged to be situated so that it is to be used by the right thumb of the user. Hence, it may be referred to as right thumb-operable control area or right hand thumb-operable control area. For majority of people, the right hand is the dominant hand, and hence it may make sense to arrange the combination of depressible buttons and touch sensor to be arranged so that they are operable with the right thumb of the user. It is noted that the controller does not necessarily comprise a touch sensor at a left thumb-operable control area.

The controller 100 may comprise at least one thumb-operable control area (and associated controls of said area). For example, if the controller has two handles 20, in some embodiments, the controller may also comprise two thumb-operable control areas with respective controls. However, for the sake of brevity, the following disclosure of the controls concentrates on one thumb-operable control area (preferably right thumb-operable control area) and its associated controls.

The controller further comprises a plurality of depressible buttons 102 (which may also be referred to as momentary buttons or push-down momentary buttons) and a touch sensor 101 (which e.g. may be implemented as capacitive sensor configured to detect touch) arranged at the thumb-operable control area 103. The buttons 102 and touch sensor 101 may also be referred to as controls of the thumb-operable control area 103. The controller body 10 is shaped to be held in a hand or hands of a user of the controller 100 such that the plurality of depressible buttons 102 is operable by a thumb of the user with or without touching the touch sensor 101. Particularly, the buttons 102 are operable with or without touching the touch sensor 101 with the same thumb that is used to operate the buttons 102. This means that the buttons 102 are operable without touching the touch sensor 101 and that the buttons 102 are operable also if the touch sensor 101 is touched. The placement of the thumb of the user at the thumb-operable control area 103 determines if the touch sensor 101 is touched or not touched. If the thumb is placed to lie on the touch sensor 101, then touch may be detected by the touch sensor. Buttons 102 may still be operable. On the other hand, if the buttons are pressed in a point-like manner from above, thumb may not touch the touch sensor 101 and thus touch may not be detected.

Alternatively or additionally, the proposed solution may be implemented using a proximity sensor. Proximity sensing may not require direct touch as the proximity of the user's thumb may be detected. The sensitivity of the proximity sensor may be configured so that it detects presence of the thumb at appropriate distance from the depressible buttons, but does not detect the presence of the thumb if the thumb is at or farther than a threshold distance from the depressible buttons. So, if the user's thumb is close enough to the depressible buttons, the proximity sensor may detect presence of user's thumb and henceforth the process may work similarly as in the case that touch is detected. Thus, similar benefits as with the touch sensor may be achieved.

The proposed solution may be implemented using both the touch sensor and the proximity sensor. Such an implementation results in additional functionality, as the user may hover a body part such as a finger over the touch sensor, which finger is consequently detected by the proximity sensor wherein the processing circuitry is configured to interpret said detection as a first control signal. The user may touch the touch sensor, which touch is consequently detected by the touch sensor wherein the processing circuitry is configured to interpret said detection as a second control signal distinct from the first signal. The hovering may be used, for example, to cause a hint to be provided to the user by, for example, the application.

With reference to both FIGS. 1 and 2, the controller 100 further comprises a processing circuitry 230 for generating at least one control signal 242 based on user interaction with the plurality of depressible buttons 102 and the touch sensor 101 and a communication interface 240 for communicatively coupling with the external computer system 110 and for providing the control signal 242 to the external computer system 110 to control the application 112, 114.

In an alternative embodiment, the generated control signal is for controlling one or more internal functions of the controller 100. Hence, it may not be necessary to provide the control signal to the external computer system 110. Thus, the benefits of the present solution may be obtained with or without the external computer system 110 which thus may not always be necessary to use. An example of internal functions may be to engage the gyroscope, for example to move the viewport of the application responsive to tilting of the controller. In this example, when the user's thumb is touching the sensor or sensed by the proximity sensor, then the gyros are engaged and a control signal is generated and sent to the application. By releasing/not touching the sensors, a different signal is generated, so the user is able to move the controller, e.g. reset it to a central position, without changing the viewport or cursor.

Now referring to FIG. 2 and particularly to the controller 100, the controller 100 may comprise one or more sensor(s) 220. For example, the sensor(s) may include one or more motion detecting circuits such as a gyroscope 222. For example, the generated control signal may be used to control the one or more sensor(s) 220 (e.g. gyroscope 222). For example, the control signal may be used to turn a sensor or sensor functionality on or off. For example, the control signal may be used to turn the gyroscope on or off.

In the case that the external computer system 110 is used, the controller 100 may be communicatively coupled with the computer system 110 as shown in FIG. 1 with arrow 40. This coupling may be enabled with suitable communication interfaces 240, 250, for example. The communication between the controller 100 and the computer system 110 may be bidirectional or unidirectional. For example, the controller 100 may transmit control signals to the computer system 110 without expecting any feedback; or the controller 100 may expect feedback related to transmitting the control signal (e.g. haptic feedback signal) or for some other purpose. Computer system 110 may execute one or more applications 112, 114. For example, the control signal(s) transmitted by the controller 100 may be used to control the operation or execution of the one or more applications (for example a computer application).

As described above, the controller 100 may comprise a processing circuitry 230. Such circuitry may be implemented with an FPGA (field-programmable gate array) or ASIC (application specific integrated circuit) circuitry, or it may be implemented with at least one processor 232 coupled with at least one memory 234 of the controller. For example, the memory 234 may include software (computer program code) that when executed by the processor 232 causes the performance of the controller 100 as described herein.

The communication interface 240 may enable the transmittance of the control signal 242 to the computer system 110. The communication interface 240 may be configured to enable wired (such as universal serial bus (USB) or local area network (LAN)) and/or wireless (such as Bluetooth, Wireless LAN (WLAN)) data transfer. These need to be understood as examples, and other wired or wireless communication methods may be used to transmit the control signal from the controller 100 to the external computer system 110.

Referring still to FIG. 2, the external computer system 110 may also comprise a communication interface 250 enabling at least the reception of the control signal from the controller 100. Interface 250 may be configured to receive wired and/or wireless data transmissions.

Further, the computer system 110 may comprise a processing circuitry 260 for causing performance of the computer system. For example, the processing circuitry may be FGPA or ASIC, or the processing circuitry 260 may comprise at least one processor 262 coupled with at least one memory 264 of the computer system. For example, the memory 264 may include software (computer program code) that when executed by the processor 262 causes the performance of the computer system 110.

In an embodiment, the memory 264 stores application 112 and/or one or more applications 114. Thus, the processing circuitry 260 may execute the stored application 112 and/or one or more applications 114. In yet another embodiment, the computer system comprises a display 270 for displaying content of the application 112 and/or application 114.

The memory or memories discussed herein may be implemented using any suitable data storage technology, such as semiconductor-based memory devices, flash memory, magnetic memory devices and systems, optical memory devices and systems, fixed memory and removable memory. The memory may comprise a database for storing data.

The processing circuitry 260 may process the received control signal 242 and control the application 112, 114 based on the processed control signal 242. For example, the processing circuitry 260 may determine the action which the application shall perform, such as a change in the rotation of the application's view-port or the cursor location. In an embodiment, the received control signal is provided by the computer system 110 directly to the application 112 (i.e. received raw control signal, without processing the signal), wherein the application 112 is configured to determine an action to be performed based on the received control signal.

At least some benefits of the proposed solution stem from the placement of the touch sensor (e.g. touch sensor 101) and/or the proximity sensor in proximity to the depressible buttons 102, and in such a manner that the buttons 102 are operable with or without invoking touch detection with the touch sensor 101 and/or proximity detection. This is different from e.g. solutions in which the sensor would be placed at the button, handle or some other area of the controller 100. For instance, if the touch sensor would be arranged at only one of the buttons 102, it would not be possible to utilize multiple buttons with or without touching said sensor. On the other hand, if each of the buttons 102 would be installed with buttons-specific touch sensor, it would increase cost and complexity of the controller design. In the case that the touch sensor would be arranged to be controlled using another finger of the user, the problem would be that said finger could not be used to control some other function of the controller. E.g. index finger and/or middle finger typically can be used to control button(s) at the top side of the controller. Finally, if the touch sensor would be located at the handle, it would, in general, be always touched when the controller is grabbed. Hence, all of these alternative placements of the touch sensor would fall short from the benefits of the proposed solution.

FIGS. 1, 3, 4, and 5 show controller design according to some example embodiments. More particularly, some examples are shown on how to arrange the touch sensor with the plurality of buttons so that the plurality of buttons are operable with or without touching the touch sensor.

According to an embodiment, the plurality of depressible buttons and the touch sensor are physically distanced apart from each other. This should be understood so that the touch sensor is not placed to or into the buttons in such a manner that at least one of the buttons would not be operable without touching the touch sensor. Such distancing may be achieved in plurality of ways. In one example, the buttons protrude above the touch sensor (i.e. are at least vertically separated). In another example, the buttons may be situated at different location on the plane at which the buttons and the touch sensor are located (i.e. are at least horizontally separated). Example of this is show in FIG. 4 in which the touch sensor 401 between the buttons 402 and horizontally distanced apart from the buttons 402. Different combinations of horizontal and vertical distancing may be used. However, again the point is that the buttons are usable (i.e. operable) with or without touching the touch sensor when the controller 100 is in use (i.e. is held in the hand or hands of the user in prescribed manner (see e.g. FIG. 7)).

Placing the touch sensor (e.g. a touch-sensitive surface) adjacent to the buttons allows both to be operated simultaneously. For example, part of the finger, such as the distal phalanx can remain in contact with the touch sensor, while the tip of the finger is able to depress the Y button (see e.g., FIG. 1). Alternatively, the A button may be depressed with the phalanx, while the finger tip remains in contact with the touch-sensitive surface. The same applies to the X and B buttons and the corresponding sides of the finger.

In an embodiment, the touch sensor comprises a touch surface. Examples of touch surfaces are shown in at least FIG. 1 and FIG. 3. A touch surface may be understood as a touch sensitive surface which is essentially a touch sensor or part of the touch sensor which is configured to detect human touch from a larger area. In other embodiments, the touch sensor may be a point-shaped touch sensor configured to detect touch from a relatively small area, for example an area which fits between the buttons. In general, it is to be noted that sensitivity of the touch sensor may be configurable and something that may be beneficial to be adjusted in order to decrease chances of misdetection. The processing circuitry 260 may be configured to adjust the sensitivity responsive to user input, for example the user could hold down at least one button and adjust the sensitivity using the arrow keys 30. Alternatively or additionally, the processing circuitry could be configured to receive and/or parse a configuration file, for example from the computer system 110, where said file specifies the sensitivity. In addition to or alternatively to the touch sensor, some form of proximity sensor can be used, said sensor configured to detect proximity of human digits, for example a thumb. Thus, in some examples, it may not be necessary to physically touch the sensor to detect touch. However, in some examples, touch of the sensor is required and the touch sensitivity may be adjustable (i.e. sensitivity of the touch sensor may be configurable).

The controller 100 may be embedded, for example, with a touch-sensitive surface in-between and surrounding the typical ABXY buttons. The size of the surface can be adjusted, e.g., to completely surround all the buttons or to limit the area for potentially differing functionality. Such touch-sensitive surface may be used to determine the exact finger position, e.g., through continuous capacitive sensing, or just detect if the finger is resting on it with a simple capacitance measurement. Person skilled in the art is aware of various different types of a touch sensor or touch surface that are configured to detect touch.

In another example, the controller 100 may be embedded with a proximity sensor (e.g. point-shaped proximity sensor) underneath the central position in-between the ABXY buttons. Suitable proximity sensors may be configured to measure at least one of infrared, ultrasonic or even optical characteristics.

In an embodiment, the touch surface 101, 301 comprises a corresponding aperture for each of the plurality of depressible buttons 102, 302. For example, if the plurality of depressible buttons 102, 302 comprises two buttons, the touch surface 101, 301 may comprise two apertures, one for each button. Similarly, if the plurality of depressible buttons 102, 302 comprises four buttons, the touch surface 101, 301 may comprise four apertures, one for each button. The apertures enable the buttons 102, 302 to protrude above the touch surface 101, 301 so that they may be used with or without touching the touch surface 101, 301. Moreover, the touch sensor may then be used to detect the touch from a relatively large area between or between and around the buttons 102, 302.

Figure 3:
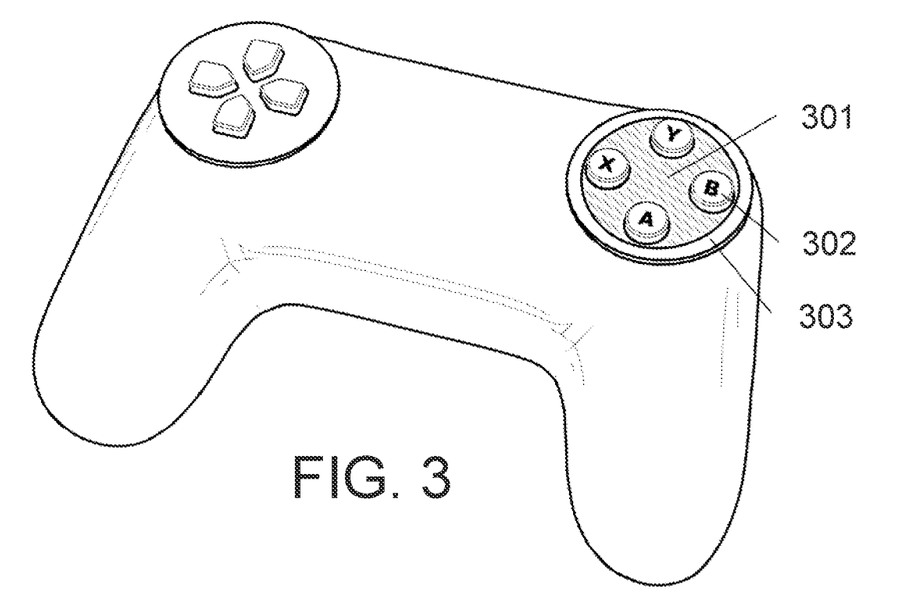
FIGS. 3, 4, 5, and 6, illustrate example embodiments of a controller, and how combination of touch sensor and depressible buttons may be arranged to be situated on the controller.

In the example of FIG. 3, the apertures are through holes. Thus, the touch surface 301 fully surrounds the buttons 302 horizontally. In the example of FIG. 1, the apertures are gaps. Thus, the touch surface 101 partially surrounds the buttons 102 horizontally.

As discussed already above, each of the plurality of depressible buttons 102, 302 may protrude through corresponding apertures above the touch surface 101, 301 such that the plurality of depressible buttons 102, 302 are usable without touching the touch surface 101, 301. Naturally, they should also be usable when the touch surface 101, 301 is touched. It is further noted that each of the plurality of depressible buttons 102, 302 may be arranged so that they protrude through corresponding apertures above the touch surface 101, 301 even if button(s) is in pressed state. Thus, even when a button is pressed down (i.e. is in pressed state), it can be released (i.e. to button not pressed state) without touching the touch surface 101, 301. As a clarification, in pressed state the button may be in downward position, and in the not pressed state the button may be in upward position.

In an embodiment, the touch surface 101, 301 at least partially surrounds the plurality of depressible buttons 102, 302.

In an embodiment, the touch surface 101, 301 is at least partially situated between the plurality of depressible buttons 102, 302.

In an embodiment, the touch surface 101, 301 covers at least most of an area on the front 12 that is situated between the plurality of depressible buttons 102, 302. In the examples of FIGS. 1 and 3, the touch surface covers all or almost all of the area between said buttons. This may be beneficial to enable larger area for detecting the touch, and thus it may be easier for the user to touch the touch sensor.

In an embodiment, the touch surface 101, 301 comprises a plurality of surfaces. Such surfaces may act as a single surface 101, 301, or each surface may act as an independent surface 101, 301 with corresponding distinct inputs, and/or the behaviour of the surfaces may be configured to be either independent or forming a single surface. The configuration may be done by a user and saved within a configuration file, for example. The plurality of surfaces may be differently sized and/or located. For example, each AXBY button may be surrounded by a touch surface. For example, a touch surface and a proximity sensor may be located near each AXBY button, whereby hovering, touching the surface and touching the button and any combination thereof may produce distinct control signals accordingly.

Figure 4:
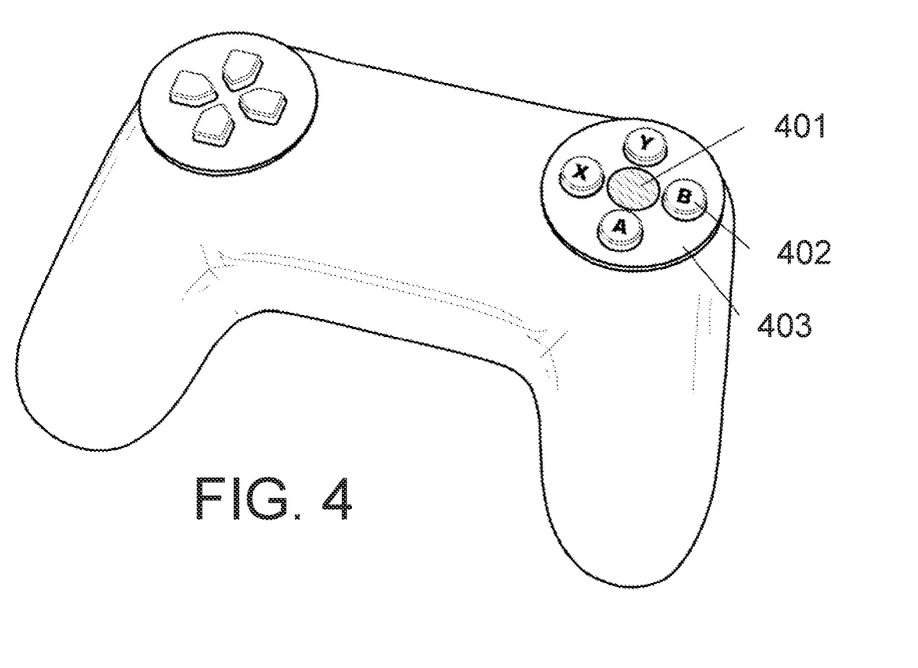

It is noted that in FIGS. 3 and 4 the thumb-operable control area is shown and associated with reference sign 303, 403. As show in the Figures, this area may sometimes be larger than what is necessary for arranging the touch sensor and depressible buttons. However, said area does not necessarily need to be larger.

According to an embodiment, the touch sensor is situated at least partially between at least two of the plurality of depressible buttons. For instance, FIG. 4 shows that the touch sensor 401 (e.g. point-shaped sensor or touch surface) is situated between the buttons 402. It could be arranged so that the touch sensor 401 is arranged between only two of the buttons, e.g. between A and B buttons. However, central location between X and B and Y and A buttons may provide even better controllability.

In an example embodiment, the touch sensor is arranged no farther than 1 centimeter from a closest one of the plurality of depressible buttons. In an embodiment, the touch sensor is arranged no farther than 2 centimeters from a closest one of the plurality of depressible buttons. Some other centimeter limit may be used, for instance, 3 centimeters.

In an example, the touch sensor is situated between the depressible buttons. This may enable the distal phalanx to interact with the touch sensor if tip of the thumb is used to press certain button or buttons and enable the tip of the thumb to interact with the touch sensor if distal phalanx is used to press certain button or buttons.

In an example, the touch sensor is arranged to not be situated between the buttons. One implementation example here is that the touch sensor is arranged to surround (fully or partially) the buttons. For example, the touch sensor may be arranged close to the outer edge of the thumb-operable control area 403. In this example, area closer to the base of the thumb may be used to interact with the touch sensor.

Figure 9A:
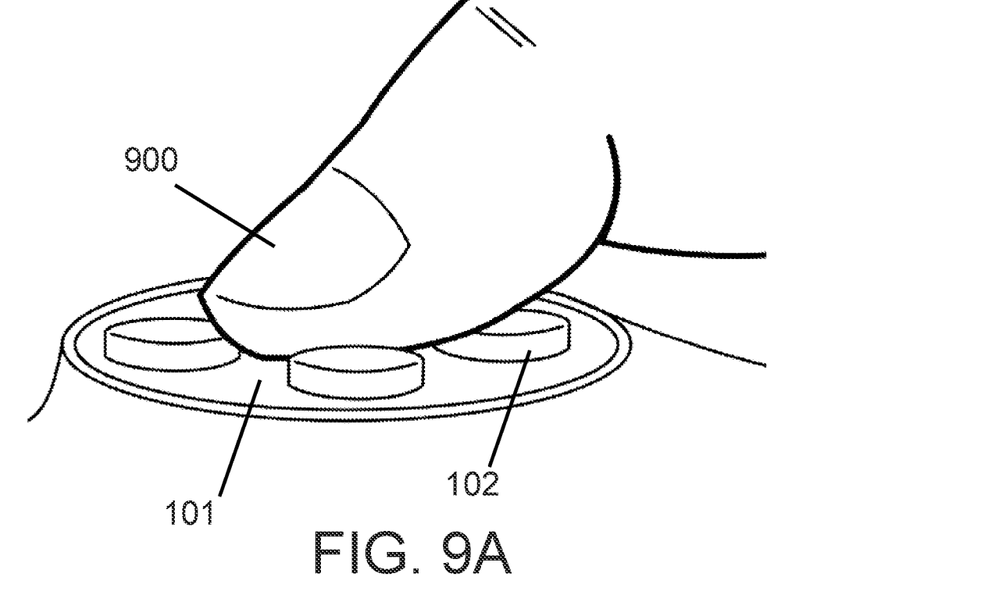
FIGS. 9A and 9B illustrate examples of interacting with a combination of touch sensor and depressible buttons using thumb.
Figure 9B:
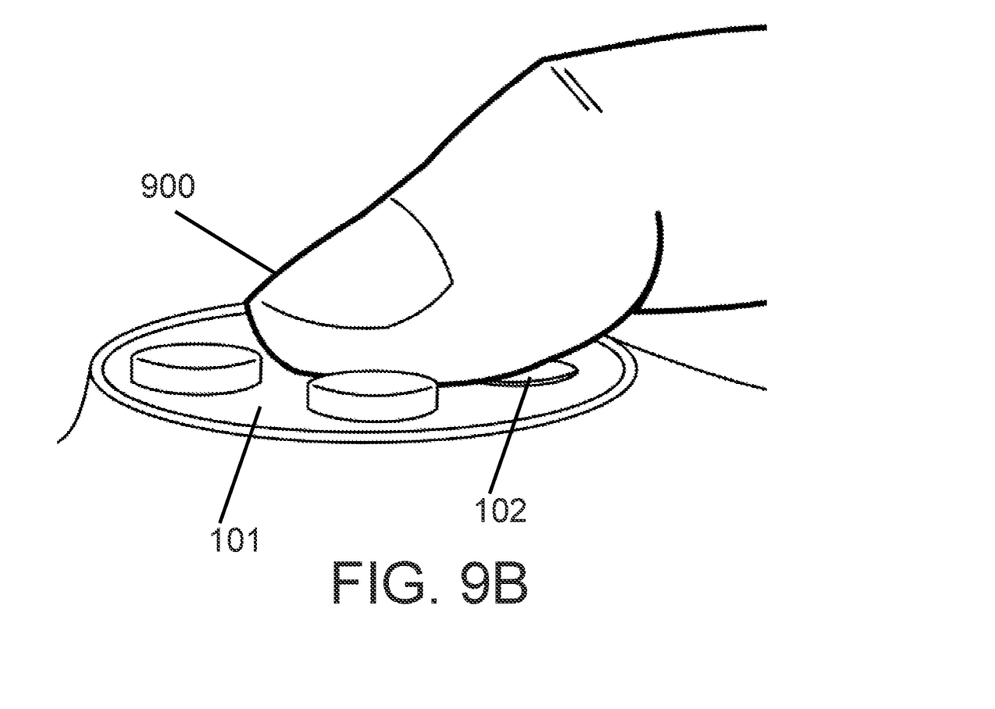

One example of how to interact with the combination of the touch sensor 101 and depressible buttons 102 is shown in FIGS. 9A and 9B. In this example, thumb 900 of the user may touch the touch sensor (e.g. touch surface) with or without pressing a button or buttons 102. This is shown in FIG. 9A in which touch sensor 101 is touched (and thus the controller may detect touch) using the thumb 900. As also explained above, as the tip of the thumb 900 is touching the touch sensor 101, the user may use distal phalanx of the thumb to press a button of the buttons 102. This is shown in FIG. 9B in which button is pressed while touch sensor 101 is touched. Although not shown in the Figures, similar logic would apply if distal phalanx of the thumb 900 would be used to touch the touch sensor 101 as then the tip of the thumb may be used to touch another button of the depressible buttons 102.

Figure 5:
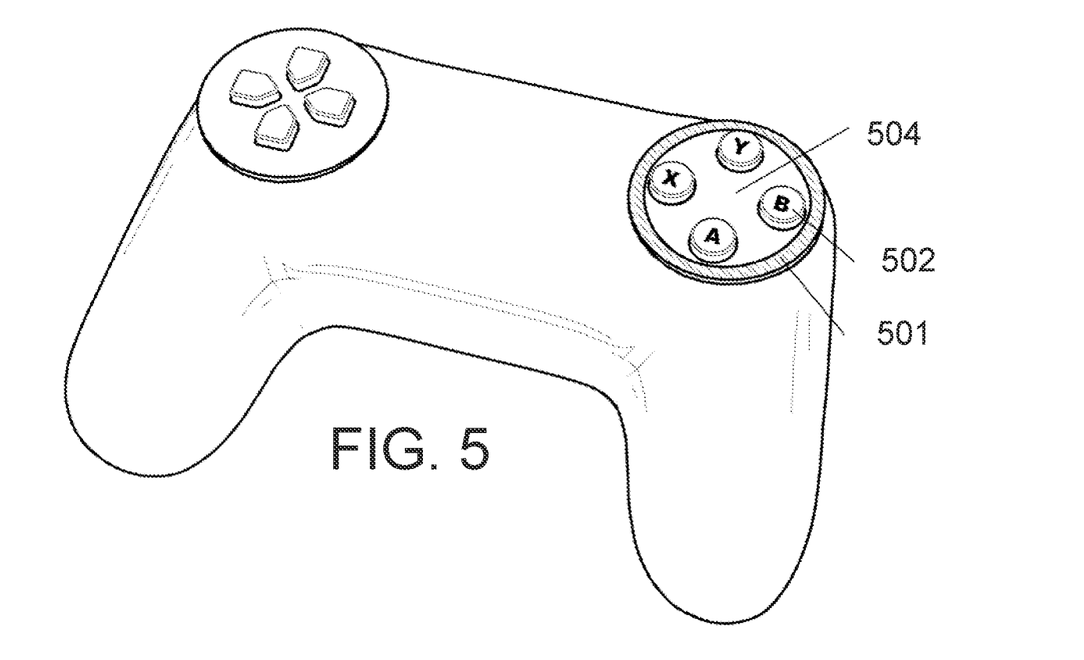

FIG. 5 shows one further example of the touch surface 501. In this example, the touch surface 501 is arranged to surround a button area 504 to/at which the buttons 502 are arranged. Hence, all of the plurality of buttons 402 may be horizontally surrounded by the touch surface 501.

According to some embodiments, the touch sensor is not depressible. This may further simplify the controller design as the separate buttons may be depressible and the separate touch sensor may be only used for detecting whether or not the touch sensor is touched.

According to some embodiments, a depressible button comprises at least one touch sensor. Such a button may be part of the ABXY or arrow buttons, or may be an additional button. In an exemplary embodiment, the depressible button comprising the touch sensor is shaped like any one of sensors 301, 401, 501, 601.

In some embodiments, the touch sensor is arranged to detect touch on the thumb-operable control area, but not to detect touch of the buttons. Hence, buttons may be touched and operated with or without detecting the touch.

In an embodiment, the depressible buttons (e.g. 102, 202, 302, 402) comprise X, Y, A, and B buttons. For example, the controller may be a game controller or comprised in a game controller. Such controller may further comprise other button(s) such as the arrow buttons 30 of FIG. 1. In an embodiment, the controller comprises touch sensor for X, Y, A, B buttons and another touch sensor for the arrow buttons. The logic for using the each touch sensor may be similar as explained herein generally for depressible buttons. E.g. even further control signals could be generated using different combinations of the buttons and the touch sensor. For example, the left-hand touch sensor could be used to modify the input of the right-hand buttons in a first manner and the right-hand touch sensor could be used to modify the input of the same right hand buttons in a second manner different from the first manner. Further, both touch sensors could be used simultaneously to modify the input of the right hand buttons in a third manner different from the first and second ones. Such configurations could further increase the flexibility of the controller use.

Figure 6:
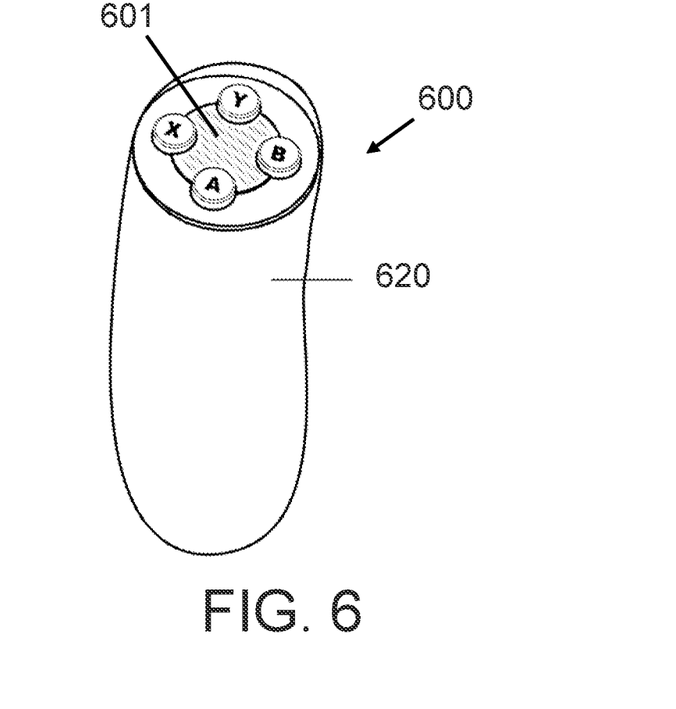
Figure 7:
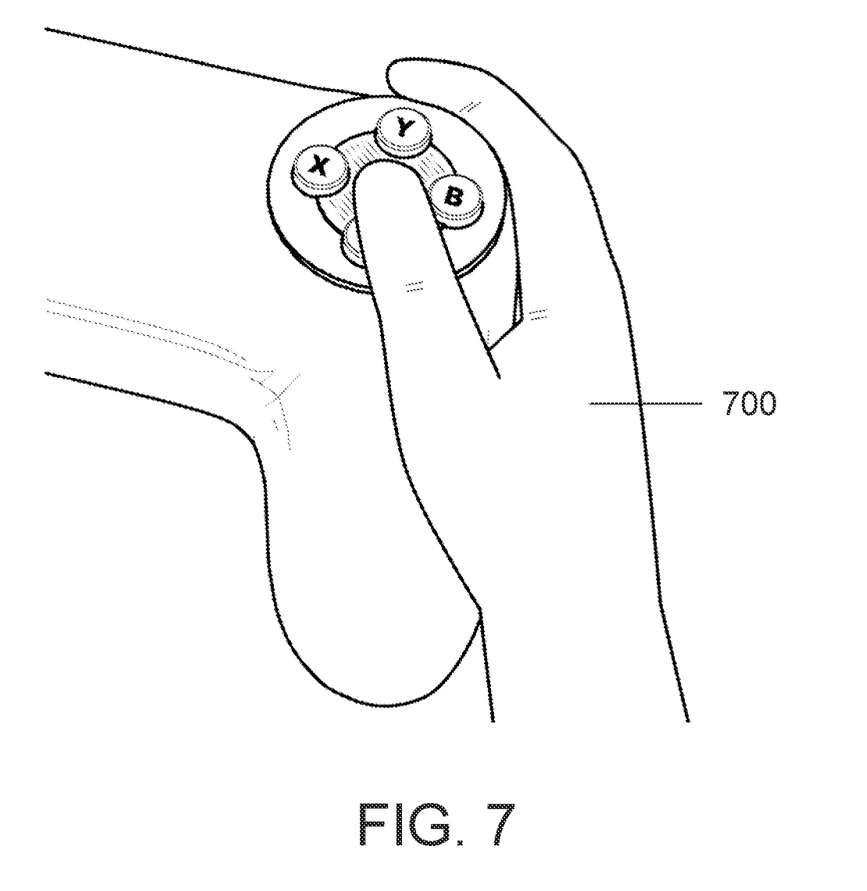
FIG. 7 illustrates an example how a user of the controller would hold an example controller and interact with the combination of touch sensor and depressible buttons.

FIG. 6 illustrates an example of one-handed controller design of a controller 600. Here the controller may comprise only one handle 620. The operation of the buttons and the touch sensor 601 may be configured according to any one or combination of the embodiments and examples described herein.

Now some of the examples relating to physical structure of the controller 100, 600 has been disclosed. Let us then draw our attention on to how the control signal may be generated based on user interaction with the buttons and the touch sensor.

Figure 8A:
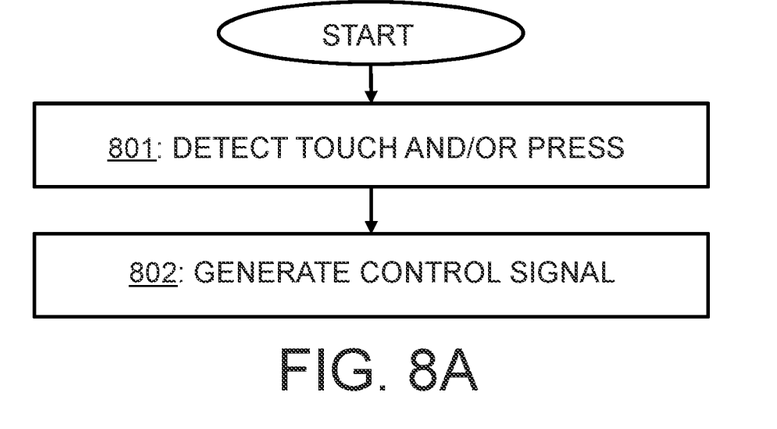
FIGS. 8A and 8B illustrate a flow diagrams according to some example embodiments.

With reference to FIG. 8A, the controller 100 may be configured to detect touch using the touch sensor (e.g. 101) and/or detect a press on one or more of the plurality of depressible buttons (e.g. 102) (block 801). Based on the detecting, the controller 100 may generate control signal (802). As discussed, the control signal may in some cases be transferred to the external computer system 110 or it may be used internally at the controller 100.

Table 2 shows some exemplary control signal variations that are achievable using four buttons (A, B, X, Y) and one touch sensor. As can be seen in the table, at least eight different control signals may be generated based on button input (button pressed) and touch sensor input (touch detected). Each of the control signals may be different or some may be the same depending on how the controller is implemented. However, at least the proposed solution enables the controller to be implemented so that eight different control signals may be generated based on button input and depending on whether or not the touch sensor detects touch. For instance, each button of the plurality of depressible buttons may be associated with a button specific control signal that is generated based on button input. As in the example of Table 2, this button specific control signal may further depend (i.e. be different, so in essence there can be two button specific control signals for each button) on whether or not touch is detected using the touch sensor.

TABLE 2

Example representation of various control combinations.

| Button input | Touch sensor input | Control signal |
|---|---|---|
| A | No | First control signal |
| A | Yes | Second control signal |
| B | No | Third control signal |
| B | Yes | Fourth control signal |
| X | No | Fifth control signal |
| X | Yes | Sixth control signal |
| Y | No | Seventh control signal |
| Y | Yes | Eight control signal |

Additionally or alternatively, the touch sensor input may be used without the button(s). I.e. a control signal may be generated using only the touch sensor input as a basis. For example, the touch sensor may be used alone to switch the gyroscope (or some other sensor) on or off. For such purpose, the button input may not be needed.

In some example embodiments, the generated control signal may comprise two control signals: one based on the button input and one other based on the touch sensor input. In this example, control signal for a button (i.e. button input) remains the same regardless of whether or not touch is detected. Control signal for touch sensor may be based on the detected touch.

Alternatively, the generated control signal may be based on both the button input and the touch sensor input. In this example, control signal for a button differs based on whether touch is detected using the touch sensor. So, for example, in this example first and second control signals would be different as one is generated based button input (button A pressed) and not detecting touch (i.e. first control signal) and the other is based on button input and detecting touch (i.e. second control signal).

According to an embodiment, the processing circuitry 230 is configured to detect a press of at least one button of the plurality of depressible buttons and/or detect touch using the touch sensor. In general, this means that the performance of the controller 100 is at least partially caused by the processing circuitry 230. For example, the processing circuitry 230 may be configured to detect a press of at least one button of the plurality of depressible buttons and to generate a first control signal (or button specific control signal) based at least on detecting the press. Example of first control signal can be seen in Table 2. However, it is noted that although some different names are given for different control signals of different buttons, similar principle may apply to all control signals.

In an embodiment, the processing circuitry 230 is configured to detect a touch using the touch sensor 101 and to generate a control signal based on detecting the touch. As discussed above, there may be two different examples on this. In one example, such control signal is generated based on touch sensor input and simultaneous button input (discussed below with respect to FIG. 8B). In another example, the control signal may be understood to be separate from button input and thus generated solely based on the touch sensor input.

Figure 8B:
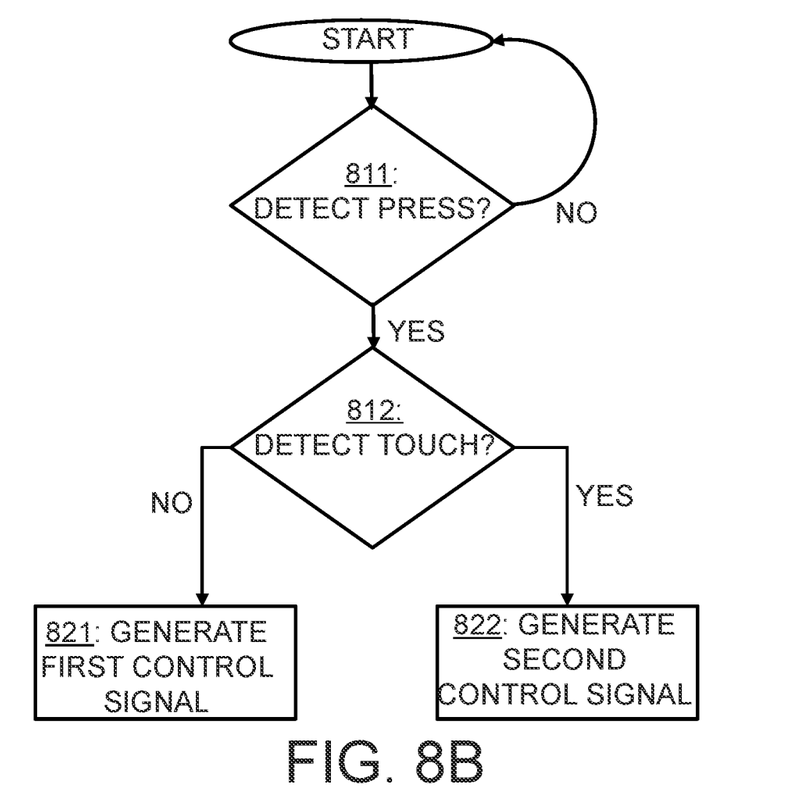

FIG. 8B illustrates an example embodiment on generating control signals based on button input (i.e. button press detected or not) and touch sensor input (touch detected or not). Referring to FIG. 8B, in block 811, the controller 100 determines whether or not press of at least one of the depressible buttons is detected. If yes, the process moves to block 812. If no, the controller 100 continues detecting button press(es).

In block 812, the controller 100 determines whether or not touch, using the touch sensor, is detected. If yes, process moves to block 822. If no, the process moves to block 821.

In block 821, the controller generates first control signal which is based on button press (of a certain button) and not detecting touch. In block 822, the controller generates second control signal which is based on button press (of a certain button) and detecting touch. First and second control signals are different, and thus the same button may be used to generate different control signals. The generated control signal may then be transmitted to the external computer system 110 or it may possibly be used to control internal function(s) of the controller 100.

Although shown to happen consecutively in FIG. 8B, it is noted that blocks 811, 812 may be performed in parallel, i.e. simultaneously or at least substantially simultaneously. In general, the controller 100 may be configured to detect whether detected button press happens simultaneously with detected touch. Thus, the controller 100 is configured to detect a simultaneous touch, using the touch sensor, and a press of at least one button of the plurality of depressible buttons and to generate a control signal based on detecting the simultaneous touch and press.

According to an embodiment, the control signal further depends on a duration for which button is pressed, a duration for which touch is detected, and/or a number of times a button is pressed within a certain time period. Using Table 2 as an example, if controller detects button A press more than once within certain time period, the generated control signal may be different than in the case that only one press is detected. For example, the detected presses of button A may need to be consecutive so that no other button presses are detected in-between. In another example, generated control signal may be different based on how long button press is detected (i.e., duration of the button being in button pressed state).

According to an embodiment, there is provided a system comprising: the controller 100; and a computer system 110 external to the controller 100, wherein the computer system 110 comprises at least one processor and at least one memory including computer program code which when executed by the at least one processor causes the computer system at least to: execute an application; receive a control signal 242 from the controller 100; and control the execution of the application based on the received control signal. The external computer system 110 may further comprise for example a display for displaying the contents of the application. In an embodiment, the external computer system is for controlling a drone. For example, the external computer system may be comprised in the drone.

An additional benefit of using the touch sensor with the depressible buttons may implementation of a safety mechanism for drones. For example, the controller may be a drone controller configured to control a drone (e.g., unmanned aerial vehicle (UAV)). The drone may be configured to return to home location based on not detecting touch with the touch sensor. For example, not detecting touch may generate a control signal that causes the drone to return home. Such a feature is useful in e.g. situations where the user is incapacitated and consequently drops the controller.

In an embodiment, an apparatus (such as the controller 100) carrying out at least some of the embodiments described comprises at least one processor and at least one memory including a computer program code, wherein the at least one memory and the computer program code are configured, with the at least one processor, to cause the apparatus to carry out the functionalities according to any one of the embodiments described. For example, the at least one processor, the memory, and the computer program code form processing means for carrying out at least some of the embodiments described. According to yet another embodiment, the apparatus carrying out at least some of the embodiments comprises a circuitry including at least one processor and at least one memory including computer program code. When activated, the circuitry causes the apparatus to perform the at least some of the functionalities according to any one of the embodiments described.

As used in this application, the term 'circuitry' refers to all of the following: (a) hardware-only circuit implementations, such as implementations in only analog and/or digital circuitry, and (b) combinations of circuits and soft-ware (and/or firmware), such as (as applicable): (i) a combination of processor(s) or (ii) portions of processor(s)/software including digital signal processor(s), software, and memory(ies) that work together to cause an apparatus to perform various functions, and (c) circuits, such as a microprocessor(s) or a portion of a microprocessor(s), that require software or firmware for operation, even if the software or firmware is not physically present.

In an embodiment, at least some of the processes described may be carried out by an apparatus (such as the controller 100) comprising corresponding means for carrying out at least some of the described processes. Some example means for carrying out the processes may include at least one of the following: detector, processor (including dual-core and multiple-core processors), digital signal processor, controller, receiver, transmitter, encoder, decoder, memory, RAM, ROM, software, firmware, display, user interface, display circuitry, user interface circuitry, user interface software, display software, circuit, antenna, antenna circuitry, and circuitry. For example, the controller 100 may comprise means for performing any of the described processes and/or actions. In an embodiment, the controller 100 comprises separate means for performing respective processes and/or actions.

The techniques and methods described herein may be implemented by various means. For example, these techniques may be implemented in hardware (one or more devices), firmware (one or more devices), software (one or more modules), or combinations thereof. For a hardware implementation, the apparatus(es) of embodiments may be implemented within one or more application-specific integrated circuits (ASICs), digital signal processors (DSPs), digital signal processing devices (DSPDs), programmable logic devices (PLDs), field programmable gate arrays (FPGAs), processors, controllers, micro-controllers, microprocessors, other electronic units designed to perform the functions described herein, or a combination thereof. For firmware or software, the implementation can be carried out through modules of at least one chip set (e.g. procedures, functions, and so on) that perform the functions described herein.

Embodiments as described may also be carried out in the form of a computer process defined by a computer program or portions thereof. Embodiments of the methods described may be carried out by executing at least one portion of a computer program comprising corresponding instructions. The computer program may be in computer readable instruction form such as source code form, object code form, or in some intermediate form, and it may be stored in some sort of carrier, which may be any entity or device capable of carrying the program. For example, the computer program may be stored on a computer program distribution medium readable by a computer or a processor. For example, the computer program medium may be a non-transitory medium.

Even though the invention has been described above with reference to an example according to the accompanying drawings, it is clear that the invention is not restricted thereto but can be modified in several ways within the scope of the appended claims. Therefore, all words and expressions should be interpreted broadly and they are intended to illustrate, not to restrict, the embodiment. It will be obvious to a person skilled in the art that, as technology advances, the inventive concept can be implemented in various ways. Further, it is clear to a person skilled in the art that the described embodiments may, but are not required to, be combined with other embodiments in various ways.

At least some embodiments of the present invention find industrial application in human-machine interface devices, in particular game controllers and drone controllers.

| REFERENCE SIGNS LIST | |
|---|---|
| controller body | 10 |
| front | 12 |
| handles | 20 |
| arrow buttons | 30 |
| arrow | 40 |
| controller device | 100 |
| touch sensor | 101 |
| buttons | 102, 302, 402, 502 |
| thumb-operable control area | 103 |
| computer system | 110 |
| application | 112, 114 |
| sensor(s) | 220 |
| gyroscope | 222 |
| processing circuitry | 230 |

-continued

| REFERENCE SIGNS LIST | |
|---|---|
| processor | 232 |
| memory | 234 |
| communication interface | 240 |
| control signal | 242 |
| communication interface | 250 |
| processing circuitry | 260 |
| processor | 262 |
| memory | 264 |
| display | 270 |
| touch surface | 301 |
| reference sign | 303 |
| touch sensor | 401 |
| thumb-operable control area | 403 |
| touch surface | 501 |
| button area | 504 |
| controller | 600 |
| one-hand controller | 600 |
| touch sensor | 601 |
| handle | 620 |
| hand | 700 |
| block | 801, 811, 812, 821, 822 |
| control signal | 802 |
| thumb | 900 |

The invention claimed is:

1. A human operable controller for controlling an application on an external computer system, the controller comprising:
a controller body comprising a front and a back, wherein the front is opposite to the back;
a thumb-operable control area arranged at the front of the controller body; and
a plurality of depressible buttons and a touch sensor arranged at the thumb-operable control area, wherein the touch sensor comprises a touch surface comprising a corresponding aperture for each of the plurality of depressible buttons;
wherein the controller body is shaped to be held in a hand or hands of a user of the controller such that the plurality of depressible buttons and the touch sensor are operable by a single thumb of the user,
wherein the plurality of depressible buttons is operable by said thumb while said thumb touches the touch sensor, and
wherein the plurality of depressible buttons is operable without said thumb touching the touch sensor;
a processing circuitry for generating at least one control signal based on user interaction with the plurality of depressible buttons and the touch sensor, wherein the processing circuitry is configured to generate:
a first control signal when a user depresses a depressible button with the single thumb while no touch is detected using the touch sensor,
a second control signal, different from the first control signal, when the touch of the single thumb is detected using the touch sensor while no depressible button is depressed, and
a third control signal, different from both the first and second control signals, when a user depresses a depressible button with the single thumb while the touch of said single thumb is simultaneously detected using the touch sensor; and
a communication interface for communicatively coupling with the external computer system and for providing the control signal to the external computer system to control the application.

2. The human operable controller of claim 1, wherein the plurality of depressible buttons and the touch sensor are physically distanced apart from each other.

3. The human operable controller of claim 1, wherein the at least one control signal is different based on whether touch is detected using the touch sensor.

4. The human operable controller of claim 1, wherein each of the plurality of depressible buttons protrude through corresponding apertures above the touch surface such that the plurality of depressible buttons are usable without touching the touch surface.

5. The human operable controller of claim 4, wherein each of the plurality of depressible buttons protrude through corresponding apertures above the touch surface even in button pressed state.

6. The human operable controller of claim 1, wherein the touch surface at least partially surrounds the plurality of depressible buttons.

7. The human operable controller of claim 1, wherein the touch surface is at least partially situated between the plurality of depressible buttons.

8. The human operable controller of claim 7, wherein the touch surface covers at least most of an area on the front that is situated between the plurality of depressible buttons.

9. The human operable controller of claim 1, wherein the touch sensor is situated at least partially between at least two of the plurality of depressible buttons or within 2 centimeters from a closest one of the plurality of depressible buttons.

10. The human operable controller of claim 1, wherein the touch sensor is not depressible.

11. The human operable controller of claim 1, wherein the touch sensor comprises a plurality of sensor areas, and wherein the processing circuitry is configured so that:
each sensor area is an independent touch sensor, or
the touch sensor is formed by the plurality of sensor areas.

12. The human operable controller of claim 1, wherein the touch sensor comprises a touch surface and a proximity sensor.

13. A method for generating a control signal, the method comprising:
detecting, by a processor within an apparatus, whether or not a touch has been detected by at least one touch sensor connected to the apparatus;
detecting, by the processor, whether or not at least one depressible button connected to the apparatus has been pressed; and
generating, by the processor, a control signal, the control signal being either a first control signal or a second control signal, the first and second control signals being distinct from one another;
wherein the first control signal is generated if at least one depressible button has been pressed and touch is not detected by the touch sensor, and wherein the second control signal is generated if the at least one depressible button has been pressed and touch is detected by the touch sensor;
wherein the apparatus comprises:
a controller body comprising a front and a back, wherein the front is opposite to the back;
a thumb-operable control area arranged at the front of the controller body; and
a plurality of said depressible buttons and touch sensor(s) arranged at the thumb-operable control area, wherein the touch sensor(s) comprises a touch surface comprising a corresponding aperture for each of the plurality of depressible buttons; and wherein the controller body is shaped to be held in a hand or hands of a user of the controller such that the plurality of depressible buttons and the touch sensor(s) are operable by a single thumb of the user,
  wherein the plurality of depressible buttons is operable by said thumb while said thumb touches the touch sensor(s), and
  wherein the plurality of depressible buttons is operable without said thumb touching the touch sensor(s);
a processing circuitry for generating at least one control signal based on user interaction with the plurality of depressible buttons and the touch sensor(s), wherein the processing circuitry is configured to generate:
  a first control signal when a user depresses a depressible button with the single thumb while no touch is detected using the touch sensor(s),
  a second control signal, different from the first control signal, when the touch of the single thumb is detected using the touch sensor(s) while no depressible button is depressed, and
  a third control signal, different from both the first and second control signals, when a user depresses a depressible button with the single thumb while the touch of said single thumb is simultaneously detected using the touch sensor(s); and
a communication interface for communicatively coupling with a external computer system and for providing the generated control signal to the external computer system to control at least one application.

14. The method of claim 13, wherein the plurality of depressible buttons and the touch sensor are physically distanced apart from each other.

15. A non-transitory computer readable medium having stored thereon a set of computer readable instructions that, when executed by at least one processor, cause an processing circuitry within a controller to at least:

detect whether or not at least one depressible button has been pressed;
detect whether or not a touch has been detected by at least one touch sensor; and
generate a control signal, the control signal being either a first control signal, a second control signal, or a third control signal, the first, second, and third control signals being distinct from one another,
wherein the first control signal is generated if at least one depressible button has been pressed while touch is not detected by the touch sensor, wherein the second control signal is generated if touch is detected by the touch sensor while no depressible button has been pressed, and wherein the third control signal is generated if the at least one depressible button has been pressed while touch is detected by the touch sensor,
wherein the controller comprises:
  a controller body comprising a front and a back, wherein the front is opposite to the back;
  a thumb-operable control area arranged at the front of the controller body; and
  a plurality of depressible buttons and a touch sensor arranged at the thumb-operable control area, wherein the touch sensor comprises a touch surface comprising a corresponding aperture for each of the plurality of depressible buttons:
wherein the controller body is shaped to be held in a hand or hands of a user of the controller such that the plurality of depressible buttons and the touch sensor is operable by a single thumb of the user, wherein the plurality of depressible buttons is operable by said thumb while said thumb touches the touch sensor, and wherein the plurality of depressible buttons is operable without said thumb touching the touch sensor.

* * * * *